(12) United States Patent
Walsh et al.

(10) Patent No.: US 6,183,021 B1
(45) Date of Patent: Feb. 6, 2001

(54) PASS-THROUGH DUAL CONTAINMENT FITTING

(75) Inventors: Matthew E. Walsh, Chanhassen; Gary A. Wolf, Young America; Eric G. Soderstrom, Sr., Lauderdale, all of MN (US)

(73) Assignee: Fluoroware, Inc., Chaska, MN (US)

( * ) Notice: Under 35 U.S.C. 154(b), the term of this patent shall be extended for 0 days.

(21) Appl. No.: 09/149,355

(22) Filed: Sep. 8, 1998

Related U.S. Application Data

(63) Continuation-in-part of application No. 08/805,688, filed on Feb. 25, 1997, now abandoned.

(51) Int. Cl.⁷ .................................................. F16L 17/00
(52) U.S. Cl. ................................. 285/123.15; 285/151.1; 285/192; 285/207; 285/139.2
(58) Field of Search .................. 285/FOR 143, 285/39, 151.1, 123.15, 192, 139.1, 139.3, 207; 52/220.8

(56) References Cited

U.S. PATENT DOCUMENTS

| | | |
|---|---|---|
| 2,268,263 | 12/1941 | Newell et al. . |
| 2,983,506 | 5/1961 | Bertsch et al. . |
| 3,860,269 | 1/1975 | Horton et al. . |
| 3,861,719 | 1/1975 | Hand . |
| 3,977,708 | 8/1976 | Jopp . |
| 4,149,568 | 4/1979 | Kuntz et al. . |
| 4,224,464 * | 9/1980 | Bunnell et al. .................... 285/151.1 |
| 4,225,162 * | 9/1980 | Dola ................................... 285/139.1 |
| 4,291,903 | 9/1981 | Fields . |
| 4,519,634 | 5/1985 | Hand . |
| 4,580,788 | 4/1986 | Rabe et al. . |
| 4,848,802 | 7/1989 | Wolf et al. . |
| 4,871,196 | 10/1989 | Kingsford . |
| 4,915,427 | 4/1990 | Zahuranec . |
| 5,265,652 * | 11/1993 | Brunella ........................... 285/123.15 |
| 5,290,071 * | 3/1994 | Rider et al. ........................ 285/139.1 |
| 5,295,760 * | 3/1994 | Rowe ................................... 285/192 |
| 5,498,036 | 3/1996 | Kingsford . |
| 5,543,582 | 8/1996 | Stark et al. . |
| 5,567,083 | 10/1996 | Osborne . |

FOREIGN PATENT DOCUMENTS

| | | |
|---|---|---|
| 0 299 471 | 7/1987 | (EP) . |
| 2681662 * | 3/1993 | (FR) ............................ 285/FOR 143 |
| 438379 | 6/1934 | (GB) . |
| 1076530 | 11/1965 | (GB) . |
| 1 360 863 | 9/1971 | (GB) . |
| 1 510 233 | 12/1975 | (GB) . |
| 2 287 997A | 2/1995 | (GB) . |

\* cited by examiner

*Primary Examiner*—Eric K Nicholson
(74) *Attorney, Agent, or Firm*—Patterson, Thuente, Skaar & Christensen

(57) ABSTRACT

A pass-through dual containment fitting that protectively seals a portion of pass-through tubing has a fitting body that incorporates a first end, a second end and a collar, each having a longitudinal bore for receiving the pass-through tubing. The second end having an extending nose portion. A radially compressive sealing device is engagable with the first end of the fitting body. When the radially compressive sealing device is fully engaged with the first end a fluid-tight seal is formed between the device and the fitting body. A dual containment sealing device incorporates containment tubing having a flared end and a flared end fitting. The extending nose portion of the fitting body is inserted into the flared end. The flared end fitting engages the second end of the fitting body to compress the flared end to the extending nose portion to form a fluid-tight seal between the dual containment sealing device and the fitting body.

21 Claims, 2 Drawing Sheets

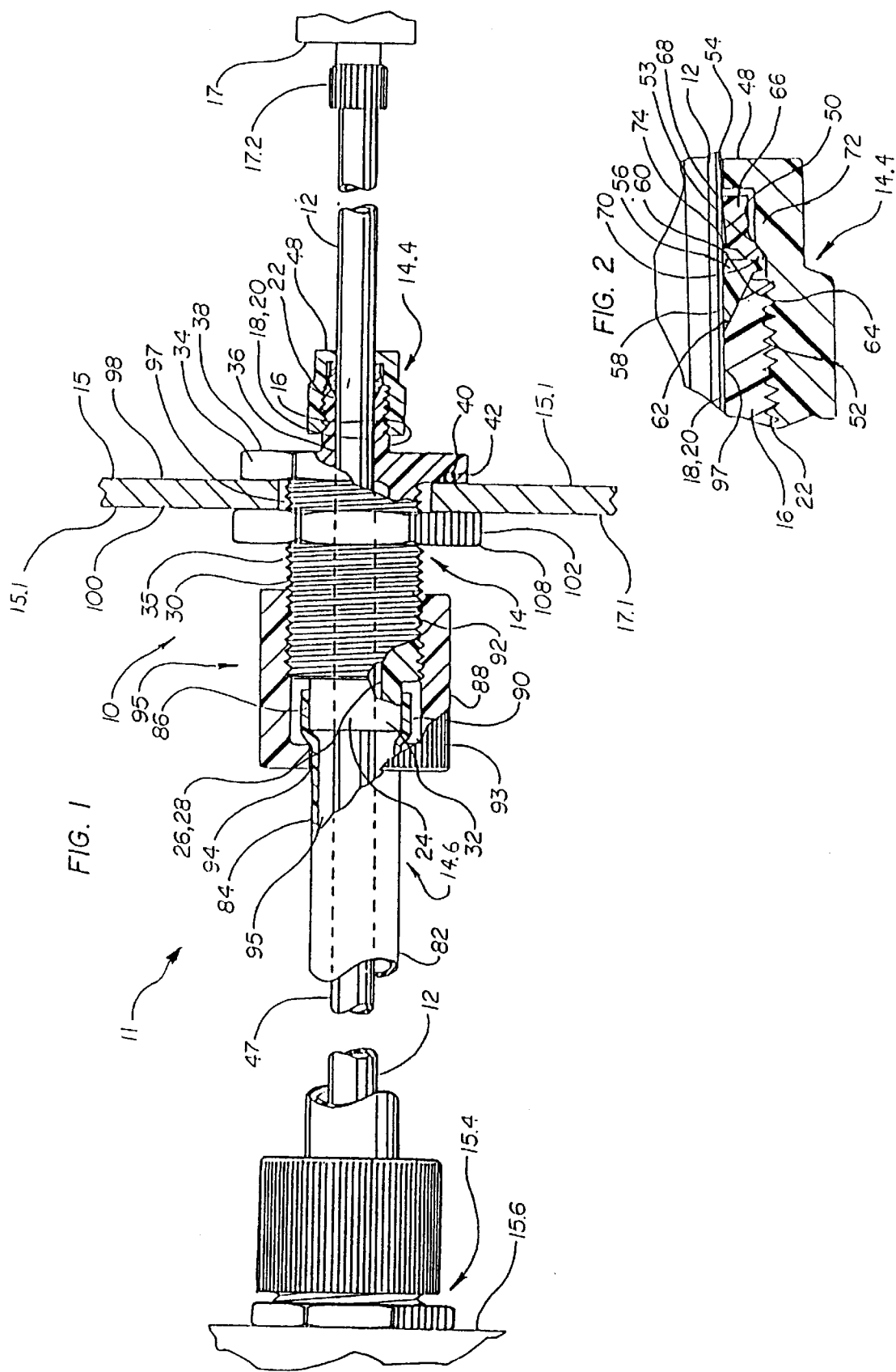

PASS-THROUGH DUAL CONTAINMENT FITTING

This application is a continuation-in-part application based on U.S. application Ser. No. 08/805,688, filed Feb. 25, 1997, now abandoned.

BACKGROUND OF THE INVENTION

This invention relates to a fluid containment device and more particularly to a dual containment fitting that protectively seals a portion of pass-through tubing.

There are a number of existing dual containment-type fittings such as those disclosed in U.S. Pat. Nos. 2,983,506, 4,871,196, and 3,861,719. Each of these patents describes inner tubing surrounded by an outer containment tubing. However, in each of these cases the inner tubing is not a true pass-through tubing but rather a tubing that terminates at the fitting creating the risk that the inner tubing may form a leak between itself and the fitting. While the outer containment tubing is there to collect any leakage, a true pass-through tubing would eliminate this risk leaving the outer containment tubing to handle only those leaks that are due to damage and/or wear to the inner tube rather than those leaks caused by a poor fitting connection.

U.S. Pat. No. 5,498,036 discloses in FIG. 5 a dual containment fitting that is mounted to the wall of an instrument cabinet. The outer containment tubing is attached to the fitting while the inner tubing passes through the outer tubing, the fitting, and into the instrument cabinet. The portion of the fitting that extends into the instrument cabinet leaves the bore, through which the inner tubing passes, open to the cabinet creating potential for danger to the instrument cabinet components. The outer tubing will contain leakage from the inner tubing, however, the level of fluid contained in the outer tubing may rise to a level such that fluid seeps into the bore surrounding the inner tubing. The fluid may continue to seep forward until it reaches the end of the bore and pours into the instrument cabinet damaging the instruments within.

Further, U.S. Pat. No. 5,498,036 provides no manner in which to fixedly position the inner tubing. Rather, the inner tubing is left to slide freely within the fitting and outer tubing.

In view of the above, there is a need for dual containment fitting that incorporates a true pass-through inner tubing to eliminate the possibility of leakage at the connection point of the inner tubing and the fitting. Further, it is desirable that this fitting provide for sealed protection at both ends of the fitting bore and that the fitting provide a manner in which the inner tubing may be fixedly positioned.

SUMMARY OF THE INVENTION

A pass-through dual containment fitting that protectively seals a portion of pass-through tubing has a fitting body that incorporates a first end, a second end and a collar, each having a longitudinal bore for receiving the pass-through tubing. The second end having an extending nose portion. A radially compressive sealing device is engagable with the first end of the fitting body. When the radially compressive sealing device is fully engaged with the first end a fluid-tight seal is formed between the device and the fitting body. A dual containment sealing device incorporates containment tubing having a flared end and a flared end fitting. The extending nose portion of the fitting body is inserted into the flared end. The flared end fitting engages the second end of the fitting body to compress the flared end to the extending nose portion to form a fluid-tight seal between the dual containment sealing device and the fitting body.

An object and advantage of an embodiment of the present invention is that the fitting allows for use of a true pass-through inner tubing. As a result, the need for the inner tubing to be coupled to the fitting body is eliminated, thereby eliminating a leakage source.

Another object and advantage of an embodiment of the present invention is that the fitting body may be equipped with protective seals at either end. Specifically, one end of the fitting body is equipped with a dual containment sealing device which provides leakage protection for the pass-through inner tubing. Additionally, the other end of the fitting body is equipped with a radially compressive sealing device which prevents leakage from the fitting body bore should the leakage contained in the dual containment sealing device seep forward into the fitting body bore.

Yet another object and advantage of an embodiment of the present invention is that the fitting body is designed to fix a section of the pass-through tubing to the fitting thereby providing further structural integrity. The fitting body secures the pass-through tubing axially as well as radially.

Yet another object and advantage of an embodiment of the present invention is that the compressive sealing device may also serve to hold the pass-through inner tubing in a fixed position making the tubing easier to handle and work with in reference to additional connections to the pass-through tubing.

Yet another object and advantage of an embodiment of the present invention is that the collar of the fitting body may incorporate a groove to receive an o-ring. With the o-ring in place, a fluid-tight seal may be made between the fitting body and the surface to which it is mounted. Said surface may include a wall, cabinet panel, or bench board.

BRIEF DESCRIPTION OF THE DRAWINGS

FIG. 1 is an elevational view in partial cross-section of a dual containment system according to the invention with a partial sectional view of dual containment fitting showing the pass-through tubing in place.

FIG. 2 is a cross-sectional view of the components of the compressive sealing device.

DETAILED SPECIFICATION

Figure 5:
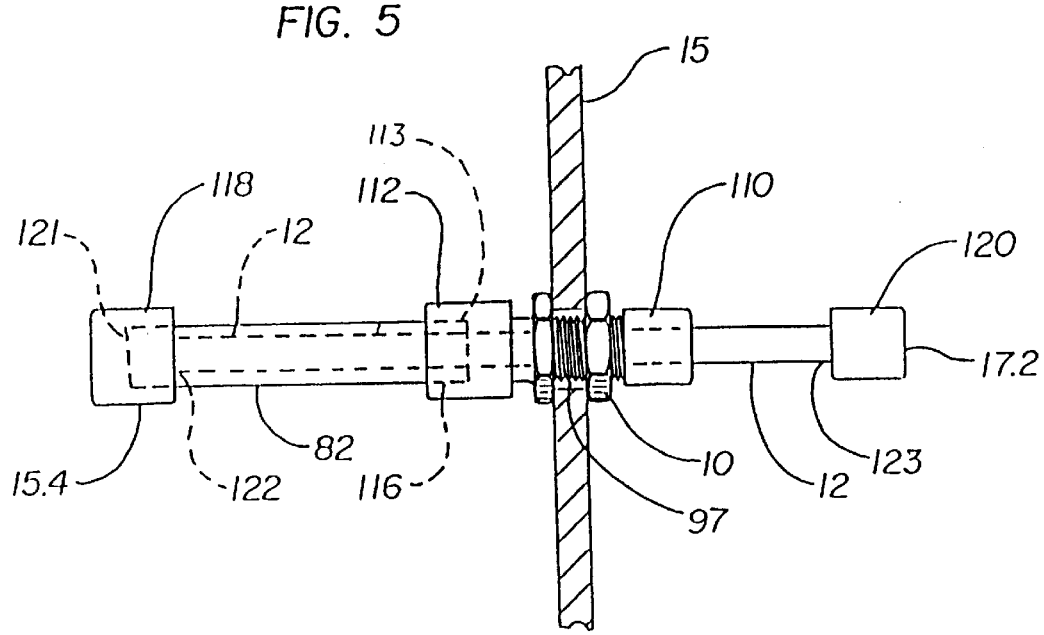
FIG. 5 is an elevation view of an alternative embodiment of the invention.

FIG. 1 is a cross-sectional view of the pass-through dual containment fitting 10 in a dual containment system 11 showing its component parts. Generally, the pass-through dual containment fitting 10 comprises a fitting body 14, a compressive sealing device 14.4, and a dual containment sealing device 14.6. All components are designed to receive pass-through tubing 12. The fitting body 14 connects to a panel 15 and provides dual containment on one side 15.1 of the panel 15 sealingly engaging the pass-through tubing on the opposite side 15.2 of the panel and allows the pass-through tubing 12 to be connected between a first connection point 15.4 on equipment 15.6 and on equipment 17 at a second connection point 17.2 remote from the panel 15. The panel 15 will typically be part of a cabinet 17.1 containing all or part of the equipment 17. The above arrangement allows an uninterrupted tubing to extend between the connection points 15.4, 17.2.

The fitting body 14 is comprised of a first end 16, a second end 24 and a collar 34 intermediate the ends 16, 24. An intermediate portion 35 with a threaded surface 30 is adjacent the collar 34. The first end 16 has a longitudinal bore 18 with an inner surface 20. The longitudinal bore 18 approximately equal in diameter to the pass-through tubing 12. The exterior of the first end 16 is a threaded surface 22. The second end 24 of the fitting body 14 has a longitudinal bore 26 that is coaxial with but larger in diameter than the first end longitudinal bore 18. The longitudinal bore has a surface 28. The threaded portion 35 extends toward the second end 24. At the second end 24 a non-threaded extending nose portion 32 extends longitudinally outward from the intermediate portion.

Intermediate the two ends 16, 24 is the collar 34. A longitudinal bore 36 that is coaxial with both the first and second end's longitudinal bores 18, 26 and has a diameter that is approximately equal to the diameter of the first end's longitudinal bore 18 extends through the collar 34. The collar's overall diameter is larger than both the first end threaded surface 22 diameter and the second end threaded surface 30 diameter. The collar's external surface 38 may be round or hexagonal so as to be engagable by a wrench. The collar 34 preferably includes a groove 40 to receive an o-ring 42. The fitting body 14 is preferably made of a rigid plastic, such as a fluoropolymer and may be molded or machined.

In a preferred embodiment of the invention the longitudinal bore 18 of first end 16 engages the exterior surface 47 of the pass-through tubing 12. In addition to providing further leakage protection, the longitudinal bore 18 fixedly positions the pass-through tubing 12.

Figure 3:
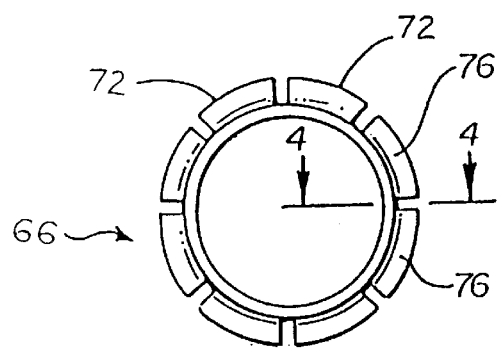
FIG. 3 is an end view of the collet of the compressive sealing device.
Figure 4:
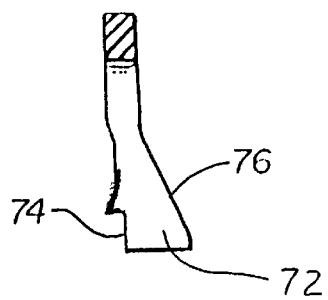
FIG. 4 is a cross-sectional view taken at line 4—4 of FIG. 3.

Referring to FIGS. 1, 2, and 3, the compressive sealing device 14.4 may generally be any type of compression fitting that sealingly engages the exterior surface 47 of the inner tubing 12. A preferred embodiment incorporates a nut 48, a ferrule 56 and a collet 66, see FIG. 2. A fitting of this type is disclosed in U.S. Pat. No. 4,848,802 which is hereby incorporated by reference. The nut 48 has a longitudinal bore 50, a threaded surface 52 for threadably engaging the first end 16 of the fitting body 14, and a tapered surface 53. The nut 38 further incorporates a bore 54 that is coaxial with the longitudinal bore 50, is of a smaller diameter, and accepts the pass-through tubing 12. The ferrule 56 has a longitudinal bore 58 for receiving the pass-through tubing 12, a rear face 60, a blunt nose 62 opposite the rear face 60 and a tapered conical outer surface 64 extending radially inward toward the longitudinal bore 58 where it converges at the blunt nose 62. Referring to FIGS. 2, 3, and 4, the collet 66 has a longitudinal bore 70 and a plurality of equally spaced arms 72 that are adjacent to and radially extend outward toward the front face. Further, the collet 66 incorporates gripping teeth 74 that are within the bore adjacent the front face 70 and are disposed circumferentially around the bore 68 on each arm 72. External to each gripping tooth 74 on each arm 72 is a wedge member 76.

The nut 48 of the compressive sealing device 14.4 threadably engages the first end 16 of the fitting body 14. During engagement the but 48 pushes the collet 66 forward until the front face 70 of the collet 66 contacts the rear face 60 of the ferrule 56 at which time the ferrule 56 is also pushed forward wedging the blunt nose 62 between the fitting body 14 and the pass-through tubing creating a fluid tight seal. As the nut 48 fully engages the first end 16 the nut 48 exerts forces on the collet 66 and its wedge members 76. These forces drive the gripping teeth 74 to grab the pass-through tubing 12 and hold it in a fixed position. When the nut 48 is fully engaged with the first end 16 the collet 66 and the ferrule 56 are completely enclosed within the nut 48 and the ferrule 56 is so inserted and compressed into the first end's longitudinal bore 18 as to form a fluid-tight seal between the compressive sealing device 14.4 and the fitting body 14.

The compressive sealing device 14.4 as shown may be made from any number of materials however an appropriate material for the nut 48 and ferrule 56 is a fluorocarbon resin material such as perfluoroalkoxy (PFA). The collet 66 is preferably made of a rigid chemically resistant material such as carbon fiber reinforced ethylene-tetra-fluoroethylene which is commercially available under the trademark TEFZEL® by Dupont. Other compressive sealing devices which sealingly engage the exterior surface of the pass-through tubing are also appropriate. For example, the device shown in U.S. Pat. No. 3,977,708 which is hereby incorporated by reference grips and seals the exterior surface of a tubing.

The dual containment sealing device 14.6 as shown in FIG. 1 comprises containment tubing 82 and an end nut 88. The containment tubing 82 has a longitudinal bore 84 to receive the pass-through tubing 12, however, the bore 84 is larger than the pass-through tubing 12 and will be used for containment of spilled materials from the pass-through tubing in the event of leakage. The containment tubing 82 has a flared end 86 that is cooperative to the second end's extending nose portion 32 and it is designed to fit snugly about the nose portion 32. The flared end nut 88 is a nut having a longitudinal bore 90 that has a threaded surface 92 for threadably engaging said second end 24 and a non-threaded shoulder portion 93 adjacent the threaded surface 92. The end nut 88 further incorporates a bore 94 that is coaxial with the longitudinal bore 90 but is of a smaller diameter to receive the containment tubing 82.

The extending nose portion 32 of the second end 24 is to be inserted into the flared end 86 of the containment tubing 82. The flared end nut 88 is threadably engaged with the second end 24. Upon full engagement with the second end 24 the flared end nut 88 completely encloses the flared end 86 and the shoulder portion 93 compresses the flared end 86 to the extending nose portion 32 creating a fluid-tight seal between the containment tubing 82 and the fitting body 14. Thus the extending nose portion 32, the threaded surface 30, and the nut 88 comprise a flared end fitting 95.

The dual containment sealing device 14.6 may also be made from numerous materials. Appropriate choices for the flared end nut 88 include polyvinyl alcohol (PVA) and polyvinylidene fluoride (PVDF) while an appropriate choice for the containment tubing is perfluoroalkoxy (PFA).

In use, the fitting body 14 is inserted through a cut-out or aperture 97 in the pane 15, e.g. panel, bench board, cabinet or wall, wherein the surface has a first side 98 and a second side 100. The second end 24 is inserted through the cut-out 97 until the collar 34 comes in contact with the first side 98 of the panel 96 thereby preventing further insertion of the fitting body 14. The collar 34, containing the o-ring 42 within its o-ring groove 40, is held tight against the panel 15 by use of a nut 102. The nut 102 is threaded onto the second end 24 until it comes in contact with the second side 100 of the panel 15 at which point it is tightened to create a fluid-tight seal between the collar 34 and the panel 15. The nut 102 preferably has a hexagonal external surface 108 so as to be wrench engaging and is preferably made of polyvinyl alcohol (PVA) or polyvinylidene fluoride (PVDF).

Prior, during or after the fitting body 14 has been mounted to the panel 15, as described above, the pass-through tubing 12 may be inserted through the fitting body 14. With the pass-through tubing 12 in place and the fitting body 14 mounted to the panel 15 the compressive sealing device 14.4 is engaged with the fitting body's first end 16 to create a fluid-tight seal between it (14.4) and the fitting body 14. The collet 66 additionally holds the pass-through tubing 12 in a fixed position. Further, the dual containment sealing device 14.6 is engaged with the fitting body's second end 24 to create a fluid-tight seal between it and the fitting body 14 and to additionally create a dual containment space 95 between the pass-through tubing 12 and the containment tubing 82.

The pass-through dual containment fitting 10 is used in fluid transfer applications in which there are concerns that the fluid itself may be contaminated or that the fluid may contaminate and/or damage other fluids, materials and/or components. The pass-through dual containment fitting 10 protects against these concerns. The first layer of protection lies with the dual containment sealing device 14.6. Should the pass-through tubing 12 within the containment tubing 82 be damaged so as to release fluid, that fluid will be contained within the containment tubing 82 thereby preventing contamination of the fluid or its surroundings. The second layer of protection lies with the compressive sealing device 14.4. Should the containment tubing 82 contain fluid there is the possibility that the fluid will travel forward in the fitting body 14 through the coaxial longitudinal bores 26, 36, 18 contained within the second end 24, the collar 34, and the first end 16. However, once the fluid is within the first end 16 it will be contained by the fluid-tight seal between the compressive sealing device 14.4 and the fitting body 14. As such, contamination and/or damage to fluids, materials and components on the first side 98 of the panel 15 will be prevented.

The third layer of protection lies in the fluid-tight seal between the collar 34 of the fitting body 14 and the first side 98 of the panel 15. Should the pass-through tubing 12 be damages such that fluid fills the containment tubing 82 and should the containment tubing 82 be damages such that the fluid spills out of the containment tubing 82 into an area, such as a cabinet or interior of a bench board, where the fluid is contained and its level rises, the collar 34 with the o-ring 42 in its groove 40 will work to prevent the fluid from seeping out the cut-out to the first side 98 of the surface or from the first side 98 to the second side 100. The collar 34 and its o-ring will work to maintain the fluid on the second side 100 of the panel 15 in the containment area.

Optionally, the use of the compressive sealing device 14.4 on the first end 16 of the fitting body 14 may be eliminated if the concerns lie only with protecting those fluids, material, and components that are located on the second side 100 of the panel 15. The dual containment sealing device 14.6 would protect the second side 100 of the panel 15 and allow the fluid contained within the containment tubing 82 to flow out the first end 16 of the fitting body 14.

Referring to FIG. 5, an alternative embodiment is shown in which the dual containment fitting 10 utilizes a compression fitting 110 to sealingly engage the inner pass-through tubing 12 and a second compression fitting 112 to sealingly engage the outer containment tubing 82 at the first end 113 of said tubing. Note that the end portions 116 of the outer containment tubing is not flared. The fittings 118, 120 at the first and second connection points 15.4 and 17.2 may be either compression fittings or flared end fitting or other appropriate fitting. Thus the second end 121 of the containment tubing may be flared or not depending on the connector used. Significantly, the inner tubing 12 is uninterrupted between its first portion 122 at the connection point 15.4 defined as the fitting 118 and the second portion 123 at the connection point 17.2 as it passes through the panel aperture 97. The first and second portions 122, 123 may be ends of the inner tubing depending on the type of connectors at the first and second connection points 15.4, 17.2.

While specific embodiments of the invention have been shown and described in detail to illustrate the application of the inventive principles, it will be understood to those skilled in the art that the invention may be embodied otherwise without departing from such principles.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. A pass-through dual containment fitting for protectively sealing a portion of pass-through perfluoroalkoxy tubing and having an exterior surface, the fitting comprising:

(a) a fluoropolymer fitting body having a longitudinal bore for receiving said pass-through perfluoroalkoxy tubing, a first end, a second end having an extending nose portion, and a collar intermediate said first and second ends, the fitting body having a threaded portion adjacent the collar for securing said fitting body;

(b) a radially compressive sealing device, having a longitudinal bore for receiving said pass-through perfluoroalkoxy tubing and comprising a collet with a plurality of gripping teeth, said compressive sealing device engageable with said first end of the fitting body; when said compressive sealing device is fully engaged with said first end of said fitting body it forms a fluid-tight seal with said fitting body and said exterior surface of said pass-through perfluoroalkoxy tubing and axially secures the tubing to the fitting; and (c) a dual containment sealing device, said dual containment device comprising a perfluoroalkoxy containment tubing having a longitudinal bore therethrough for receiving said pass-through perfluoroalkoxy tubing and having a flared end, said flared end fitting engageable with the second end of the fitting; whereby said flared end fitting engages to said nose portion forming a fluid-tight seal between said dual containment device and said fitting body.

2. The pass-through dual containment fitting of claim 1, wherein said collar is of a larger diameter than said second end such that said second end of said fitting body may be inserted through an aperture in a panel, said panel having first and second surfaces, said collar comprising first and second nuts to engage said first and second surfaces of said panel respectively, whereby said nuts cooperatively secure said fitting body within said aperture.

3. The pass-through dual containment fitting of claim 2, wherein said collar has a circular groove for receiving an o-ring, said o-ring creating a fluid-tight seal with one of said first and second surfaces when said first and second nuts secure said fitting body within said aperture of said panel.

4. The pass-through dual containment fitting of claim 1, wherein said compressive sealing device comprises a nut, a ferrule and a collet, said nut engaging said first end and driving said collet forward into said ferrule and said ferrule forward into said longitudinal bore of said first end; when said nut is fully engaged said nut completely encloses said collet and said ferrule causing said collet to secure said pass-through tubing in a fixed position.

5. The pass-through dual containment fitting of claim 1, wherein said collar further comprises an external wrench engaging surface.

6. The pass-through dual containment fitting of claim 2, wherein said nut further comprises an external wrench engaging surface.

7. A pass-through fluoropolymer dual containment fitting for protectively sealing a portion of pass-through perfluoroalkoxy tubing, comprising:
  (a) a fitting body having a longitudinal bore for receiving said pass-through perfluoroalkoxy tubing, a first threaded end, a second threaded end having an extending nose portion, and a collar intermediate said first and second threaded ends, said collar having an annulus for receiving an o-ring, a nut having a longitudinal bore threadably engageable with said second threaded end for maintaining said fitting body in a fixed position;
  (b) a compressive sealing device, said compressive sealing device having a longitudinal bore for receiving said pass-through tubing and comprising a collet with a plurality of gripping teeth, said compressive sealing device threadably engageable with said first threaded end; whereby when said compressive sealing device is fully engaged with said first threaded end said compressive sealing device forms a fluid-tight seal with said fitting body and securely grips the perfluoroalkoxy pass through tubing; and p1 (c) a dual containment sealing device, said dual containment device comprising a perfluoroalkoxy containment tubing and a flared end fitting, said perfluoroalkoxy containment tubing having a longitudinal bore therethrough for receiving said pass-through tubing and having a flared end, said nose portion insertable into said flared end, said flared end fitting threadably engagable with the second threaded end; whereby when said flared end fitting fully engages with said second threaded end, said flared end fitting compresses said flared end to said nose portion forming a fluid-tight seal between said dual containment device and said fitting body.

8. The pass-through dual containment fitting of claim 7, wherein said collar is of a larger diameter than said second threaded end such that said second threaded end of said fitting body may be inserted through a cut-out surface, said surface having first and second sides, said collar stopping further insertion of said fitting body through said cut-out by contacting said first side of said surface, said nut threadably engaged with said second threaded end until said nut contacts said second side of said surface to hold said fitting body in position within said cut-out and to hold said collar tight against said surface.

9. The pass-through dual containment fitting of claim 8, wherein said o-ring within said annulus creates a fluid-tight seal with said first side of said surface when said nut is engaged with said second threaded end to said second side of said surface.

10. The pass-through dual containment fitting of claim 9, wherein said compressive sealing device comprises a nut, a ferrule and a collet, said nut while engaging said first threaded end driving said collet forward into said ferrule and said ferrule forward into said longitudinal bore of said first threaded end, when said nut is fully engaged said nut completely encloses said collet and said ferrule; when said nut is fully engaged, said collet gripping said pass-through tubing such as to hold said pass-through tubing in a fixed position.

11. The pass-through dual containment fitting of claim 7, wherein said collar further comprises an external wrench engaging surface.

12. The pass-through dual containment fitting of claim 7, wherein said nut further comprises an external wrench engaging surface.

13. A pass-through dual containment fitting for protectively sealing a portion of pass-through tubing, comprising:
  (a) a fluoropolymer fitting body having a longitudinal bore for receiving said pass-through tubing, a first threaded end, a second threaded end, and a collar intermediate said first and second threaded ends, said collar having an annulus for receiving an o-ring, said collar of a larger diameter than said second threaded end such that said second threaded end of said fitting body may be inserted through a cut-out in a surface, said surface having first and second sides, a nut threadably engageable with said second threaded end such that said nut contacts said second side of said surface for holding said fitting body in position within said cut-out;
  (b) a compressive sealing device having a longitudinal bore for receiving said pass-through perfluoroalkoxy tubing and comprising a plurality of gripping teeth for gripping said tubing, said compressive sealing device threadably engagable with said first threaded end; whereby when said compressive sealing device is fully engaged with said first threaded end said compressive sealing device forms a fluid-tight seal with said fitting body and the collet gripping teeth grip the perfluoroalkoxy tubing axially fixing said tubing therein; and
  (c) a fluoropolymer dual containment device comprising a containment tubing and a fitting, said containment tubing having a longitudinal bore therethrough for receiving said pass-through tubing, said fitting engageable with said second threaded end forming a fluid-tight seal between said dual containment device and said fitting body.

14. The pass-through dual containment fitting of claim 13, wherein said o-ring within said annulus creates a fluid-tight seal with said first side of said surface when said nut is engaged with said second threaded end to said second side of said surface.

15. The pass-through dual containment fitting of claim 13, wherein said collar further comprises an external wrench engaging surface.

16. The pass-through dual containment fitting of claim 13, wherein said fitting body is made from TEFLON® (polytetrafluroethylene).

17. A dual containment system for connecting between a first connection point and a second connection point and for providing passage through a panel aperture, the system comprising:
  (a) a central perfluoroalkoxy pass-through tubing extending between the two connection points, the tubing integral and uninterrupted as it passes through the panel aperture, the pass-through tubing having an exterior surface;
  (b) a plastic dual containment fluoropolymer fitting secured to the panel at said panel aperture, the fitting having a first end and a second end and comprising a collet with a plurality of gripping teeth at said first end for gripping the perfluoroalkoxy tubing and holding said tubing securely in place, the first end sealingly engaged to the exterior surface of the pass-through tubing; and
  (c) an outer containment tubing extending between the first connection point and the plastic fitting and containing the pass-through tubing, the outer containment tubing having an end portion sealingly engaged at the fitting.

18. The dual containment system of claim 17 wherein the end portion of the outer containment tubing is flared.

19. The dual containment system of claim 17 wherein the pass-through tubing has a first portion sealingly connected at the first connection point and a second portion sealingly connected at the second connection point.

20. A fluoropolymer dual containment fitting for engaging a portion of a perfluoroalkoxy pass-through tubing having an exterior surface and for engaging an end portion of a outer perfluoroalkoxy containment tubing surrounding said pass-through tubing, the end portion of the outer perfluoroalkoxy containment tubing having an exterior surface and an interior surface, the dual containment fitting comprising:

(a) a fluoropolymer fitting body having a first end with a threaded exterior surface, a second end with a threaded exterior surface, and an intermediate portion between the first and second ends, the fitting having a bore extending therethrough for receiving the pass-through tubing;

(b) a collet with a plurality of gripping teeth for gripping and securing the perfluoroalkoxy pass through tubing, the collet positioned at the first end;

(c) a nut threadably engageable on the exterior threaded surface of the first end for sealingly engaging the exterior surface of the portion of perfluoroalkoxy pass-through tubing and for driving the gripping teeth into the perfluoroalkoxy pass through tubing; and (c) a nut threadably engagable on the exterior surface of the second end for sealingly engaging the end portion of the plastic outer containment tubing on at least one of the interior or exterior surfaces of the containment tubing.

21. The fitting of claim 20 wherein the threaded exterior surface of the second end and the first nut comprise a flared end fitting.

* * * * *